United States Patent Office 3,068,216
Patented Dec. 11, 1962

3,068,216
PREPARATION OF HIGH MOLECULAR WEIGHT ISOTACTIC POLYMERS FROM ALPHA-OLEFINIC HYDROCARBONS
Harmen de Vries, Geleen, Jacobus P. Schuhmacher, Sittard, and Johannes C. Soeterbroek, Geleen, Netherlands, assignors to Stamicarbon N.V., Heerlen, Netherlands
No Drawing. Filed Sept. 10, 1959, Ser. No. 839,053
1 Claim. (Cl. 260—93.7)

The present application is a continuation-in-part of our copending application Serial No. 790,350, filed February 2, 1959.

The present invention relates to the preparation of high molecular weight isotactic polymers from alpha-olefinic hydrocarbons containing at least three carbon atoms in the molecule.

Belgian Patent No. 543,259 and its addition No. 549,638 described a process for the polymerization of alpha-olefines of the general formula $CH_2=CHR$, in which R represents an aryl group or a linear alkyl group (Belgian Patent No. 549,891 also mentions branched alkyl groups). In said process, a catalyst is used which is the product of a reaction between a compound of a transitive metal of the 4th—6th sub-groups of the periodic system and an alkyl compound of a metal of the 2nd—3rd groups. In this known process, the arrangement of the atom groups in the polymer molecules can be influenced, both by control of the particle size and the degree of dispersion of the catalyst particles in an inert dispersion medium, and by varying either the valence of the metal of the 4th—6th sub-groups used, or the nature of the compound of that metal, or the nature of the alkyl-metal compound to be reacted with this compound.

Thus, catalysts promoting the formation of high molecular weight crystalline, so-called isotactic, polymers are obtained by reacting the chloride of conventional trivalent titanium with an alkyl compound of a metal of the 2nd—3rd groups containing less than five carbon atoms per alkyl groups, e.g. triethyl aluminum.

If titanium trichloride is to be used according to this known method, then, it is necessary to prepare first this hard-to-obtain substance. The conventional method of preparing titanium trichloride, viz. reduction of titanium tetrachloride by means of hydrogen, is not easy and, hence, not attractive for practical purposes.

Furthermore, it is known that the preparation of the so-called Ziegler catalysts for the polymerization of ethylene from titanium tetrachloride—which preparation is carried out by reacting it with a metal of the 1st—3rd groups of the periodic system, or with a hydride or an organometallic compound of such a metal in an inert dispersion medium—leads to the formation of a dark brown product that can be used as a catalyst for the preparation of ethylene polymers without being separated from the dispersion medium.

Also, according to German Patent No. 1,019,466, an alkyl-aluminum compound, such as a trialkyl-aluminum and/or alkyl-aluminum halogenide, is reacted with a compound of a transitive metal of the 4th—6th sub-groups of the periodic system, and the resulting reaction product is subsequently separated out and, if desired, washed with an inert liquid, such as a hydrocarbon. The reaction product obtained in this way is used, together with an alkyl-aluminum compound, as a catalyst in the polymerization of ethylene.

If, in the preparation of the catalyst in this way, the starting material used is an alkyl aluminum compound which is reacted with titanium tetrachloride in an inert liquid, there is obtained a dark brown reaction product which contains titanium, chiefly in the form of titanium trichloride, and which can be separated by filtration and washed with an inert liquid for the removal of adhering byproducts.

It has been found that, although the brown titanium trichloride obtained in this way is very suitable for forming, in combination with an alkyl aluminum compound, a catalyst for the polymerization of ethylene to high molecular weight crystalline polymers, nevertheless, good results are not obtained, and only a small amount of isotactic polymers but mainly amorphous polymers are obtained when this brown titanium trichloride, in combination with an alkyl aluminum compound, is used in the polymerization of propylene and higher alpha-olefines. The brown titanium trichloride when used as catalyst component shows a good catalytic activity, however, only little stereospecificity, so that amorphous polymers are mainly obtained.

This brown titanium trichloride differs from the violet titanium trichloride, prepared in the conventional way by reduction of titanium tetrachloride with hydrogen, not only in color but also as regards its properties as a catalyst component, as the conventional violet titanium trichloride is well suited to promote the formation of isotactic polymers when used as catalyst component, in the polymerization of propylene and higher alpha-olefines, as also appears from the aforementioned Belgian patents.

However, notwithstanding an attractive stereospecificity, the conventional violet titanium trichloride shows only little catalytic activity when used as catalyst component so that only low yields of polymers are obtained therewith.

It has now been found by applicants that, in the polymerization of alpha-olefinic hydrocarbons containing at least three carbon atoms in the molecule, by means of catalysts obtained by adding together an alkyl aluminum compound and a reaction product containing titanium, mainly in the form of titanium trichloride, and formed by reacting titanium tetrachloride with a hydride or organometallic compound of a metal of the 1st—3rd groups of the periodic system, the formation of high molecular weight isotactic polymers is promoted if, prior to the addition of the alkyl aluminum compound and the reaction product containing titanium—mainly in the form of titanium trichloride—this reaction product is exposed to a temperature of from 200°–500° C.

In carrying out the process according to the invention, the reaction product containing titanium, mainly in the form of titanium trichloride—which product will for the sake of simplicity be called brown titanium trichloride—is obtained by adding together titanium tetrachloride and a hydride or organometallic compound of a metal of the 1st—3rd groups of the periodic system; following such addition, a reaction takes place and titanium trichloride is formed as a dark brown product.

The titanium tetrachloride may be reacted with e.g. sodium hydride or cesium hydride, or with organometallic compounds, such as dimethyl magnesium, diethyl cadmium, dipropyl zinc, dihexyl zinc, methyl sodium and diphenyl cadmium. Particularly suitable substances for this purpose are the aluminum compounds, such as diethyl aluminum hydride, di-isobutyl aluminum chloride, triethyl aluminum, trimethyl aluminum, triphenyl aluminum, diethyl aluminum chloride, methyl aluminum dichloride, diphenyl aluminum chloride, ditolyl aluminum bromide, and the so-called sesquihalogenides, such as ethyl aluminum sesquichloride and ethyl aluminum sesquibromide. The sesquichloride is a mixture of diethyl aluminum chloride and ethyl aluminum dichloride; the sesquibromide is a mixture of the corresponding monobromides and dibromides.

In a preferable method of carrying out the process according to the invention, the brown titanium trichloride is formed as a solid phase dispersed in an inert liquid, which phase is next separated from the liquid. By washing with an inert liquid, adhering impurities can be removed. When an inert liquid is used, the reaction is less violent and the removal of heat may be effected in a simple manner. The inert liquid used can be a saturated hydrocarbon, such as hexane, heptane, cyclohexane or alkyl cyclohexane. Other dispersion media, such as gasoline, kerosine, benzene, toluene and halogenated hydrocarbons, such as chlorobenzene, can be used.

In the preparation of the reaction product containing titanium, mainly in the form of titanium trichloride, the titanium tetrachloride gives off a chlorine atom to the reducing agent used. This method of preparation yields a chlorinated reducing agent as a byproduct. For instance, if the reducing agent be aluminum triehtyl, then, the byproducts will be chlorinated aluminum compounds such as diethyl aluminum chloride, monoethyl aluminum dichloride, and aluminum trichloride. After exposure to a temperature of 200–500° C., this reaction mixture can be combined as a whole with an alkyl aluminum compound, and can be used for polymerizing, say, propylene. However, this involves the drawback that the reaction mixture has to be mixed with comparatively large amounts of alkyl aluminum compound to produce a sufficiently acitve catalyst system, since part of the added alkyl aluminum compound is converted into a less active chlorinated alkyl aluminum compound by the chlorinated reducing agent present as a byproduct.

For example, if tripropyl aluminum, di-isobutyl aluminum hydride or diethyl aluminum chloride are used for the alkyl aluminum compound, then, these will be partly converted into the less active alkyl aluminum dichloride by reaction with the chlorinated aluminum compounds, such as aluminum trichloride, present as a byproduct.

Preferably, the process according to the present invention is carried out in such a way that the reaction product containing titanium is formed as a suspension in an inert liquid, after which the byproducts contained in the said suspension are, at least partly, removed by distillation in the presence of a liquid preferably a hydrocarbon, with an atmospheric boiling point above 180° C.

After termination of the reducing reaction, the liquid with an atmospheric boiling point above 180° C., can be added to the reaction mixture in which the titanium-containing reaction product is present. However, it is preferred to use a liquid boiling, wholly or partly, at temperatures above 180° C. as the inert liquid in the reducing reaction because, in that case, nothing further has to be added to the reaction mixture after termination of the reducing reaction. If desired, a portion of the liquid, for example one half thereof, can be carefully decanted from the precipitate prior to the removal by distillation, of the byproducts from the resultant thickened suspension.

It is not necessary for the distillation of the byproducts to be carried out under atmospheric pressure. This can also be done in vacuo, for example, at 10 cm. mercury or at a lower pressure. In that case, it is possible to use relatively low temperatures so that the titanium-containing reaction product does not, or practically does not, become converted into its stereospecifically active form. Heating at temperatures of 200–500° C. can then be continued for as long a period of time as may be required in each particular case, with a view to obtaining the desired activity and stereospecificity of the catalyst. Furthermore, the pressure chosen may be such that the temperature and the heating time needed for the conversion into the more stereospecifically active form are obtained during the distillation; this has the advantage that further heating can be omitted.

As liquid with an atmospheric boiling point above 180° C., there can be selected a liquid having such a high boiling point that during the volatilization of the byproducts—which, if desired, can be carried out while a stream of inert gas is being passed through—the liquid will not distill, or hardly distill. It is preferred, however, to choose a liquid, for example, a hydrocarbon fraction with an atmospheric boiling range of 175–250° C., which distills to a considerable extent together with the byproducts, so that the said byproducts will be more easily carried along in the vapor phase. Excess of $TiCl_4$, if any, distills together with the actual byproducts. For example, when $TiCl_4$ and aluminum triethyl in the molar ratio 4:1 have been used as the starting materials, unconverted $TiCl_4$ distills off together with the halogenated aluminum compound(s).

According to the invention, the crude titanium trichloride is preferably exposed to the temperature of 200–500° C. in an inert liquid. In this process, the crude titanium trichloride is suspended in an inert liquid and the suspension is subsequently heated. If a liquid boiling at a sufficiently high temperature, e.g. kerosine or a higher boiling hydrocarbon oil, is used, then, the pressure need not be raised if the temperature is maintained below the boiling point of the oil. Very high pressures, above 50 atm., can mostly be avoided.

This manner of carrying out the process has the advantage that the brown titanium trichloride that has been washed with an inert liquid need not be prepared as a liquid-free product, but can immediately be suspended in the same or in another inert liquid and be exposed to the high temperature. Its combination with the alkyl aluminum compound for the purpose of preparing the polymerization catalyst can thereafter be effected in an immediately following treatment, by adding the alkyl aluminum compound to the suspension.

According to another method of carrying out the process, the brown titanium trichloride is exposed to the high temperature by dry heating, in which process care is taken to exclude moisture and oxidizing gases, such as air. To this end, the solid substance can be heated in vacuo or in an atmosphere of an inert gas, e.g. nitrogen, or an inert vapor, e.g. a hydrocarbon vapor.

The time during which the crude titanium trichloride is exposed to the high temperature need not be long. Preferably, a temperature of 200–350° C. is used, at which temperature a time of about 20–45 minutes suffices. At higher temperatures, e.g. 400, 450 or 500° C., a shorter time will suffice, but working at these higher temperatures is less attractive in practice. At lower temperatures, e.g. at 150° C., no improvement of the action of the titanium trichloride is obtained even after long heating periods.

After being exposed to the high temperature of between 200 and 500° C., the titanium trichloride and an alkyl aluminum compound are added together; this can be done in a known manner by using an inert liquid as a dispersing medium. It is not necessary that this adding together of the two substances takes place immediately after the exposure of the crude titanium trichloride to the high temperatures. The titanium trichloride treated according to the invention retains its favorable activity when kept in an inert atmosphere.

Preferably, a trialkyl aluminum compound, such as triethyl aluminum, tripropyl aluminum, dimethyl ethyl aluminum, diethyl isobutyl aluminum, tri-isobutyl aluminum or trihexyl aluminum is used as the alkyl aluminum compound. However, other alkyl aluminum compounds, such as alkyl aluminum hydrides and alkyl aluminum halogenides, e.g. diethyl aluminum hydride, diethyl aluminum chloride or di-isobutyl aluminum chloride can also be used.

The adding together of the catalyst components can also be effected during the polymerization process, e.g. by adding continuously separate streams of the alkyl aluminum compound and the titanium trichloride to the reaction mixture during polymerization.

The ratio of the two components in the catalyst can be varied. There is mostly used an equiatomic ratio of Al and Ti, or an atomic ratio of Al: Ti>1, e.g. Al/Ti=2 or 3, and good results are obtained with such ratios.

In this way, catalysts are obtained which are suited to the polymerization at low pressure, below 100 atm., of propylene and other alpha-olefinic hydrocarbons, such as 1-butene, 1-pentene or styrene, in which polymeric products are obtained which largely consist of isotactic polymers, usually, over 70%.

Example 1

A vessel having a capacity of 3 litres and equipped with a stirrer, contains a solution of 95 g. (½ mole) of titanium tetrachloride in 1.5 litres of heptane. While this solution is being stirred, a solution of 49.5 g. (¼ mole) tri-isobutyl aluminum in 1 litre or heptane is added slowly, in one half hour, at room temperature, following which stirring is continued for 10 more minutes. When the reuslting precipitate has settled, the liquid is removed by decantation and the solid substance is washed several times by stirring it in heptane and decanting the washing liquid. The crude titanium trichloride obtained in this way (75 g.) is next heated at 250° C. for 30 minutes.

The treatments mentioned above are carried out in an argon atmosphere, air and moisture being excluded. The titanium trichloride is cooled and then kept under argon or suspended in heptane, to be used for polymerization experiments.

The polymerization of propylene is carried out in a 1-litre shaking autoclave, which is constantly moved to and fro (20 reversions of motion per minute). In this autoclave, there are added together 0.463 g. (3 m. moles) of titanium trichloride, 1.14 g. (10 m. moles) of triethyl aluminum and 500 ml. of dried heptane. Subsequently dry, oxygen-free propylene is fed into the autoclave and, during the polymerization process, the temperature in the autoclave is maintained at 70° C. and the pressure is kept at 2.5 atm. by continuously feeding in propylene.

After six hours, the supply of propylene is stopped and the resulting polymer suspension is diluted with 500 ml. of heptane and then transferred into a stirred vessel. The catalyst is decomposed by distributing 15 ml. of butanol in the suspension and stirring for 60 minutes at a temperature of 80–90° C. The polymer suspended in heptane is washed with a mixture of methanol and water, filtered off and dried. In this way, 80.5 g. of dry polypropylene is obtained, 95% of which is isotactic polymer. By extraction with diethyl ether at 30–35° C. and thereafter with hexane at 65° C., 3.4 g. of amorphous polypropylene is dissolved from the polypropylene. A further quantity of amorphous polypropylene, 10.4 g., is recovered from the heptane which had been separated off.

Example 2

Polymerization is carried out during five hours, in the manner described in Example 1, with a catalyst mixture consisting of 0.618 g. (4 m. moles) of the prepared titanium trichloride and 1.14 g. (10 m. moles) of triethyl aluminum in 500 ml. of heptane, the pressure being maintained at 5 atm. by continuously feeding in propylene.

The yield was 134 g. of isotactic polypropylene and 35.5 g. of amorphous polypropylene.

Example 3

Crude titanium trichloride is prepared in a manner similar to that described in Example 1, the heating period now being 15 minutes and the temperature 500° C. 1.173 g. (7.6 m. moles) of the resulting crude titanium trichloride together with 1.73 g. (15.2 m. moles) of triethyl aluminum in 500 ml. of heptane, was used as a catalyst.

The polymerization is carried out in the manner described in Example 1, the pressure being 5 atm. and the polymerization time six hours.

The yield is 30 g. of isotactic polypropylene and 6.5 g. of amorphous polypropylene.

This example shows that, owing to the very high temperature af 500° C. used in heating the titanium trichloride, the activity of the catalyst is low. Nevertheless, by far the greater part of the polypropylene obtained is isotactic in structure.

Example 4

The preparation of titanium trichloride is carried out as a continuous process. A solution of titanium tetrachloride in heptane (½ mole per litre of heptane) and a solution of di-isobutyl aluminum hydride in heptane (¼ mole per litre of heptane) are fed continuously, and in separate streams, into a stirred vessel in such a way that during this operation the molar ratio of Al and Ti is maintained at unity. When the stirred vessel is filled to half of its capacity with the reaction mixture, part of this mixture is continuously withdrawn from the vessel, care being taken to keep the volume of the reaction mixture in the vessel constant, the residence time in the vessel being 15 minutes. The temperature in the stirred vessel is maintained at 15–20° C.

The withdrawn suspension is continuously washed with heptane; the crude titanium trichloride is subsequently separated from the liquid, the yield per hour of crude titanium trichloride being 75 g.

The process is carried out in a nitrogen atmosphere, air and moisture being excluded.

Part of the crude titanium trichloride prepared in this way is heated at 100° C. for 1.5 hours, part at 300° C. for 20 minutes.

The titanium trichloride heated at 100° C. is used in the manner described in Example 1, together with triethyl aluminum, for the polymerization of propylene, the process being carried out at a pressure at 5 atm. and being continued for seven (7) hours.

The yield is 126 g. of isotactic polypropylene and 120 g. of amorphous polypropylene.

The titanium trichloride heated at 300° C. was used for the polymerization of propylene under the same conditions; the yield was 185 g. of isotactic polypropylene and 18 g. of amorphous polypropylene.

Example 5

500 ml. of a 1-molar solution of aluminum triethyl in a hydrocarbon portion with an atmospheric boiling range of 175–250° C. is added at room temperature, slowly and with simultaneous stirring, to one liter of a 1-molar solution of $TiCl_4$ in the same solvent with careful exclusion of oxygen and moisture. After three hours, the temperature is raised to 200–225° C., with the result that about one liter of the hydrocarbon fraction distills off together with the bulk of the byproducts. Following combination with an alkyl aluminum compound, for example triethyl aluminum, di-isobutyl aluminum hydride or dipropyl aluminum chloride, the residue can now be used without further heating for the polymerization of say, propylene, to produce a highly isotactic product.

It will be appreciated from the foregoing that the heating as referred to of the brown titanium trichloride, surprisingly confers new properties on it which are manifest when it is used as a catalyst or catalyst component. As a result of the heating the brown titanium trichloride is at least in part converted into a new modification, which was hitherto unknown. This new modification when used in the polymerizataion of olefines as described surprisingly possesses a special stereospecific capacity to promote the formation of isotactic polymers. The present invention therefore includes titanium reaction products of the said compounds which have been heat-treated as described.

We claim:

The method of polymerizing alpha-olefinic hydrocarbons containing at least 3 carbon atoms in the molecule at pressures below 100 atmospheres to obtain polymeric products predominantly isotactic in structure, comprising the steps of: adding the said alpha-olefinic hydrocarbons to a catalyst formed by the addition of aluminum trialkyl to titanium trichloride, obtained by reacting titanium tetrachloride at a temperature of 15–20° C. with a substance selected from the group consisting of hydrides of metals of the 1st—3rd groups of the periodic system, and organo-metallic compounds of such metals, and heating the titanium trichloride formed to a temperature within the range of 200–350° C. for a period of 20–45 minutes.

References Cited in the file of this patent

UNITED STATES PATENTS

| | | |
|---|---|---|
| 2,893,984 | Seelbach et al. | July 7, 1959 |
| 2,898,327 | Gilbert et al. | Aug. 4, 1959 |
| 2,899,416 | Schreyer et al. | Aug. 11, 1959 |
| 2,904,486 | Bown et al. | Sept. 15, 1959 |
| 2,914,515 | Stuart | Nov. 24, 1959 |
| 2,938,000 | Wanless et al. | May 24, 1960 |
| 2,951,045 | Gamble et al. | Aug. 30, 1960 |

FOREIGN PATENTS

| | | |
|---|---|---|
| 811,633 | Great Britain | Apr. 8, 1959 |

UNITED STATES PATENT OFFICE
CERTIFICATE OF CORRECTION

Patent No. 3,068,216                    December 11, 1962

Harmen de Vries et al.

It is hereby certified that error appears in the above numbered patent requiring correction and that the said Letters Patent should read as corrected below.

In the heading to the printed specification, between lines 9 and 10, insert -- Claims priority, application Netherlands Feb. 6, 1958 --; column 1, line 36, before "weight" strike out the comma; column 3, line 16, for "triehtyl" read -- triethyl --; line 26, for "acitve" read -- active --; column 5, line 13, for "or" read -- of --; line 16, for "reuslting" read -- resulting --.

Signed and sealed this 2nd day of July 1963.

(SEAL)
Attest:

ERNEST W. SWIDER
Attesting Officer

DAVID L. LADD
Commissioner of Patents